US008985062B1

(12) United States Patent
Syberg

(10) Patent No.: US 8,985,062 B1
(45) Date of Patent: Mar. 24, 2015

(54) POST-SURGICAL PET WEAR GARMENT

(71) Applicant: Stephanie Syberg, O'Fallon, MO (US)

(72) Inventor: Stephanie Syberg, O'Fallon, MO (US)

( * ) Notice: Subject to any disclaimer, the term of this patent is extended or adjusted under 35 U.S.C. 154(b) by 36 days.

(21) Appl. No.: 13/775,219

(22) Filed: Feb. 24, 2013

Related U.S. Application Data

(60) Provisional application No. 61/603,612, filed on Feb. 27, 2012.

(51) Int. Cl.
*A01K 13/00* (2006.01)

(52) U.S. Cl.
CPC .................................. *A01K 13/006* (2013.01)
USPC .......................................... 119/850; 119/856

(58) Field of Classification Search
USPC .................................................. 119/850, 856
IPC ....................................................... A01K 13/00
See application file for complete search history.

(56) References Cited

U.S. PATENT DOCUMENTS

| | | | |
|---|---|---|---|
| 3,141,443 A * | 7/1964 | Huey | 119/854 |
| 4,335,600 A | 6/1982 | Wu | |
| 4,355,600 A * | 10/1982 | Zielinski | 119/850 |
| 4,527,991 A | 7/1985 | Msarsa | |
| 5,068,921 A * | 12/1991 | Jones | 2/2.5 |
| D329,927 S | 9/1992 | Thomas | |
| D330,273 S | 10/1992 | Cernek | |
| 5,463,985 A | 11/1995 | Shover | |
| 6,070,557 A | 6/2000 | Hibbert | |
| 6,234,117 B1 | 5/2001 | Spatt | |
| 2005/0263104 A1 * | 12/2005 | Lazarowich | 119/850 |
| 2008/0264351 A1 * | 10/2008 | Williams | 119/850 |
| 2010/0132631 A1 * | 6/2010 | Walker-Algaze | 119/850 |
| 2013/0036989 A1 * | 2/2013 | Pesale | 119/850 |

FOREIGN PATENT DOCUMENTS

| | | | | | |
|---|---|---|---|---|---|
| JP | 2000032864 A | * | 2/2000 | | A01K 13/00 |
| JP | 2003174832 A | * | 6/2003 | | A01K 13/00 |

OTHER PUBLICATIONS

Machine translation of JP 200032864 to Masukawa, dated Feb. 2000.*
Machine translation of JP 2003174832 to Sudo, dated Jun. 2003.*

* cited by examiner

*Primary Examiner* — Peter M Poon
*Assistant Examiner* — Kathleen Alker
(74) *Attorney, Agent, or Firm* — Creati Venture Law; Linda L. Lewis

(57) ABSTRACT

A post-surgical animal garment which fits over, above, and about the animal's body, and optionally, fastens along the back of the animal. The garment has a head opening and leg portions with openings for the legs of the animal. The rear portion of the garment fits around the animal's tail. The garment has a forwardly folding flap which can be attached to the belly side of the garment for the animal to readily perform its bodily functions without the flap getting in the way. Once the animal is finished, the flap is readily put back in place to protect the surgical site. The garment can include a collar which fits about the neck of the animal as well as sleeves which extend partially along the legs of the animal. Optionally, the termini of the leg portions are foot coverings.

12 Claims, 5 Drawing Sheets

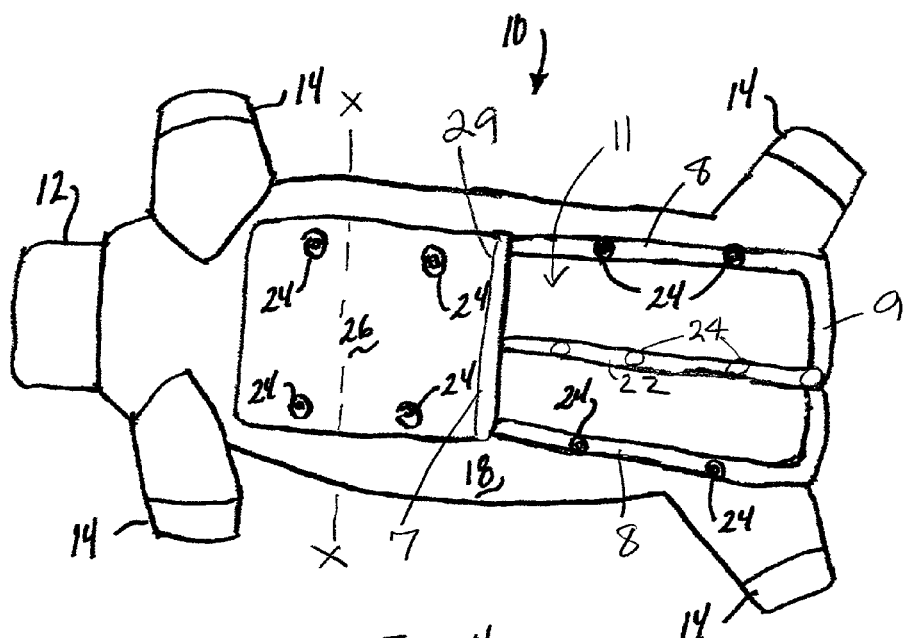
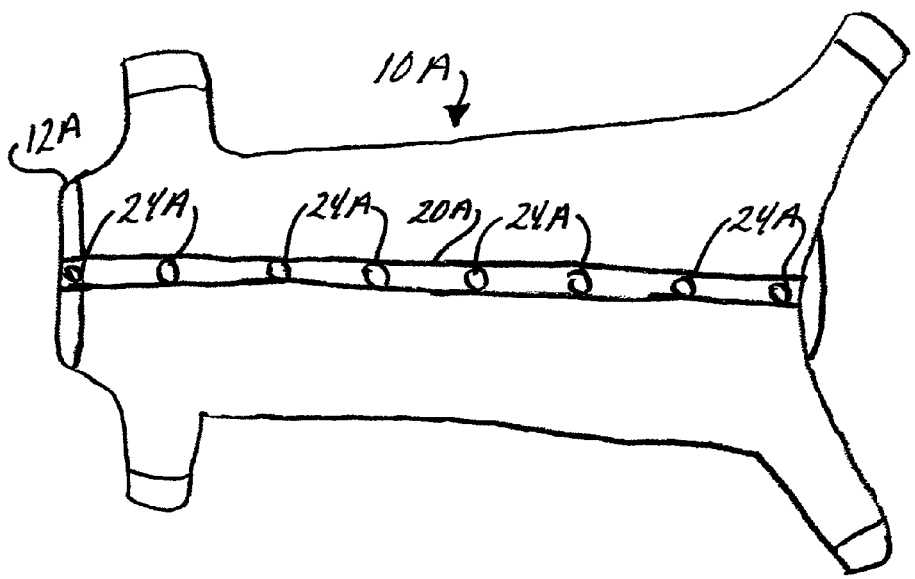

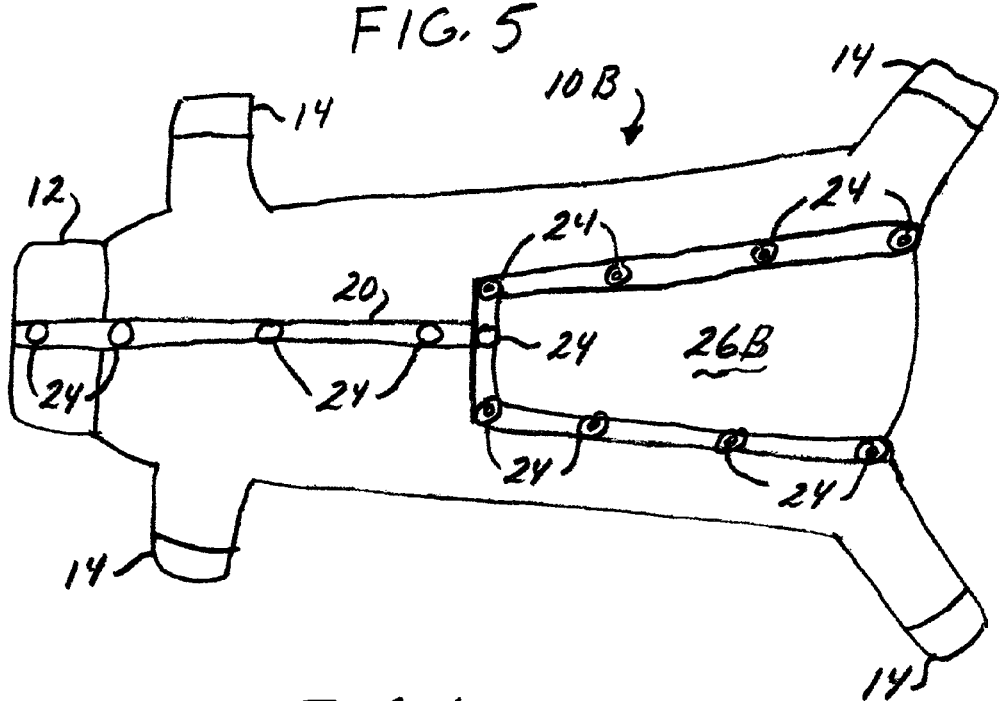
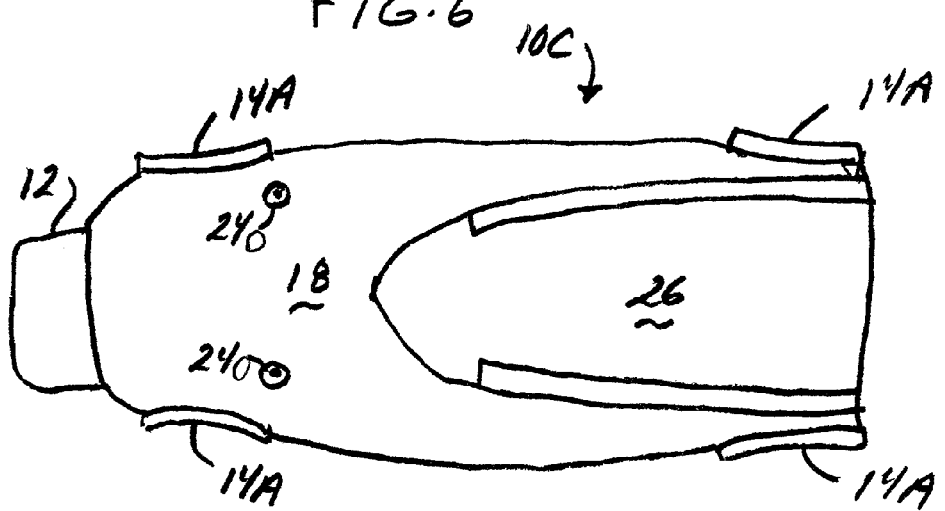

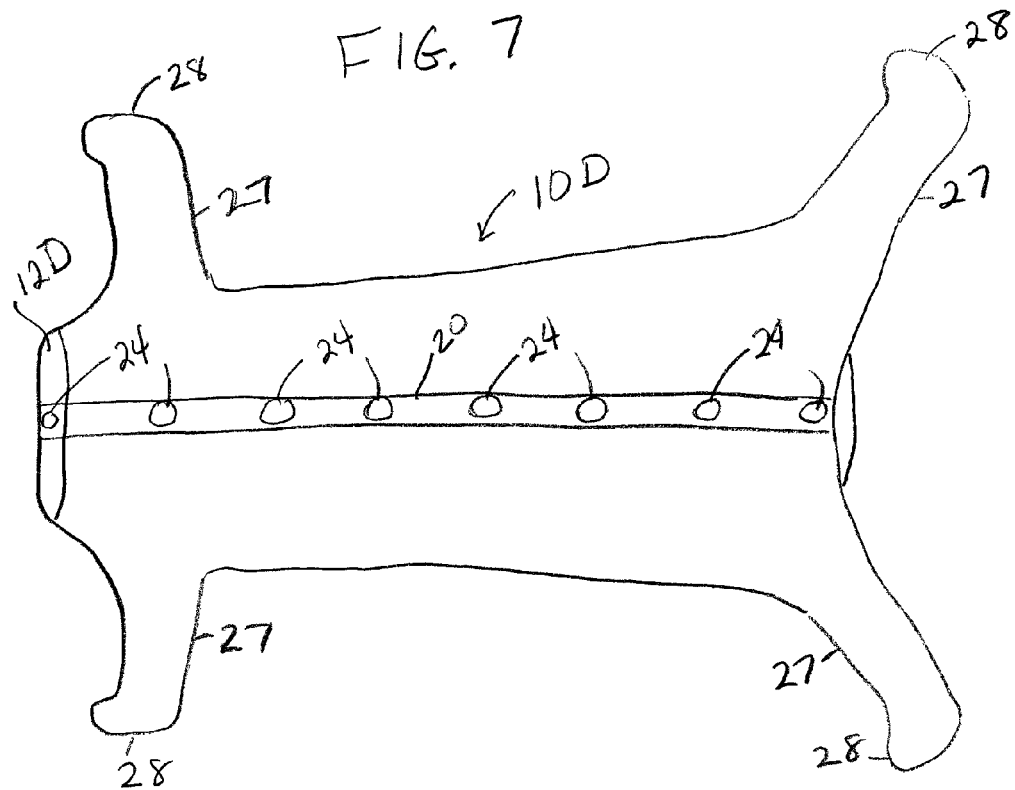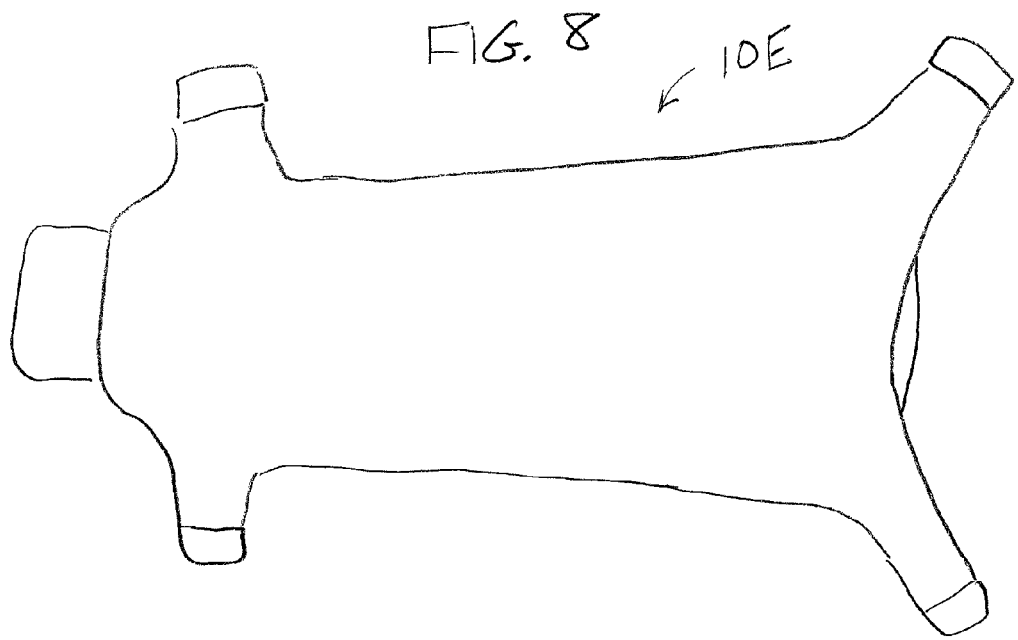

POST-SURGICAL PET WEAR GARMENT

CROSS-REFERENCE TO RELATED APPLICATIONS

This application claims the benefit of U.S. Provisional Patent Application No. 61/603,612 filed Feb. 27, 2012 which is hereby incorporated by reference.

STATEMENT REGARDING FEDERALLY SPONSORED RESEARCH

Not Applicable.

APPENDIX

Not Applicable.

BACKGROUND OF THE INVENTION

1. Field of the Invention

The present invention relates to a protective garment for four-legged animals (quadrupeds) and more particularly to a post-surgical garment worn primarily by dogs and cats which protects the belly of the animal and includes a movable flap that allows the animal to perform its bodily functions without soiling its garment.

2. Related Art

Many dogs and cats are neutered or spayed. Care of the animal, post-surgery, presents problems. In particular, it is important to protect the surgical site so that stitches are not torn or bandages covering the wound are not displaced. This needs to be done so that the wound can heal quickly and the chances of any infection are minimized. Further, normal dog and cat behavior, which includes licking at their fur and pawing at their bodies (scratching) creates the risk of damage to the surgical site and the risk of infection.

In the past, various types of garments, including post-surgical garments, have been proposed for wearing by animals. See, for example, U.S. Pat. Nos. 6,234,117, 5,463,985, 4,527,991, 4,335,600, D330,273, D329,927, and published U.S. Patent Application 2010/0132631. Some of these garments are of a one-piece construction, and others are of a two-piece construction. While all of these garments provide some protection to the animal wearing them, all have some drawback. For example, some garments cannot be readily fastened about the animal, or require a lot of time and effort to put on the animal. Some of the piece garments do not fully cover and protect the surgical site. Some garments cannot readily accommodate the needs of the animal to urinate or defecate.

The post-surgical garment of the present invention addresses these problems by providing a garment a veterinarian fastens easily onto the dog's body, adequately protects the surgical site, and is readily reconfigured to allow the dog to perform its normal bodily functions.

SUMMARY OF THE INVENTION

The post-surgical animal garment of the present invention is a garment which fits over, above, and about the animal's body. Optionally, it fastens along the back of the animal. The garment a head opening and has leg portions with openings for the legs of the animal and the rear portion of the garment fits around the animal's tail. A forward folding flap extends over the belly, rear portion of the garment and, when in the closed position, protects the stomach and belly area of the animal.

It is a feature of the garment to protect a surgical site on the animal. This includes preventing the animal form pawing, licking, chewing, or otherwise scratching this area so that stitches or sutures used to close up an incision are not pulled apart, and the closed wound not torn open thereby increasing the risk of infection.

It is further a feature of the garment to have a forwardly folding flap which can be attached to the belly side of the garment for the animal to readily perform its bodily functions without the flap getting in the way. Once the animal is finished, the flap is readily put back in place to protect the surgical site.

The garment can include a collar which fits about the neck of the animal as well as sleeves which extend partially along the legs of the animal. Optionally, the termini of the leg portions can end in foot coverings.

The garment is made of a lightweight breathable, stretchable, and washable material which can be of a variety of colors or patterns. The flap is made of an absorbent material to absorb drainage from the wound or "accidents" the animal may have.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 3 is a plan view similar to that of FIG. 2, with the flap in its open, unlocked position.

FIG. 4 is similar view to FIG. 1, but without a collar;

FIG. 5 is a top view of an alternate embodiment of the garment in which the flap folds up over the back of the garment;

FIG. 6 illustrates another alternate embodiment of the garment;

FIG. 7 is a plan view of the portion of the garment which fits over the back of the animal and has foot coverings;

FIG. 8 is a plan view of the portion of the garment which fits over the back of the animal, and does not open down the back and does not have fasteners down the back.

DETAILED DESCRIPTION OF THE PREFERRED EMBODIMENTS

The following description of the preferred embodiment(s) is merely exemplary in nature and is in no way intended to limit the invention, its application, or uses.

Figure 1:
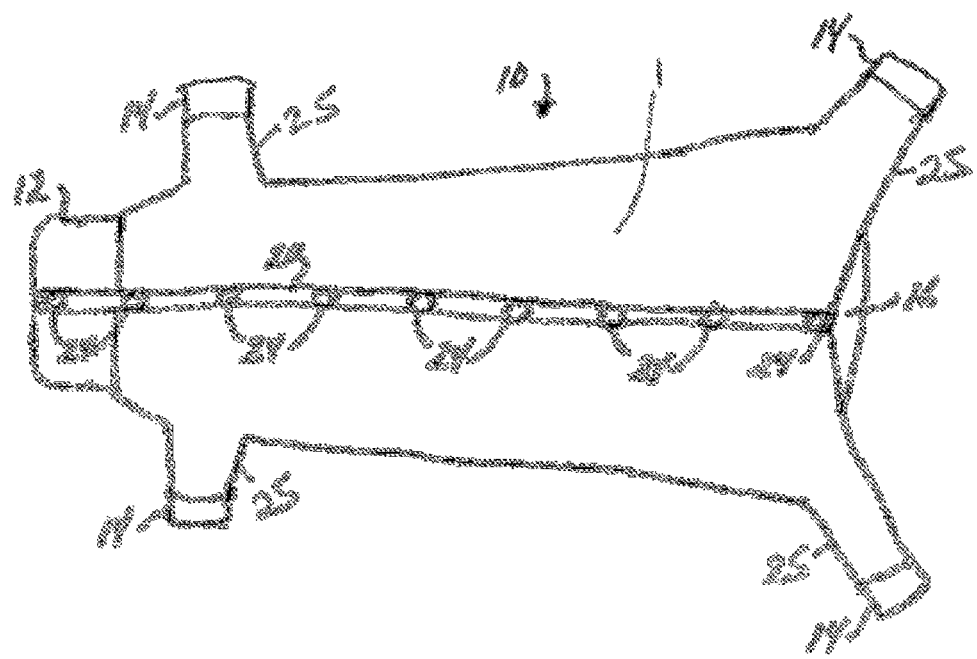
FIG. 1 is a plan view of the portion of the garment which fits over the back of the animal, with fasteners down the back of the garment.
Figure 2:
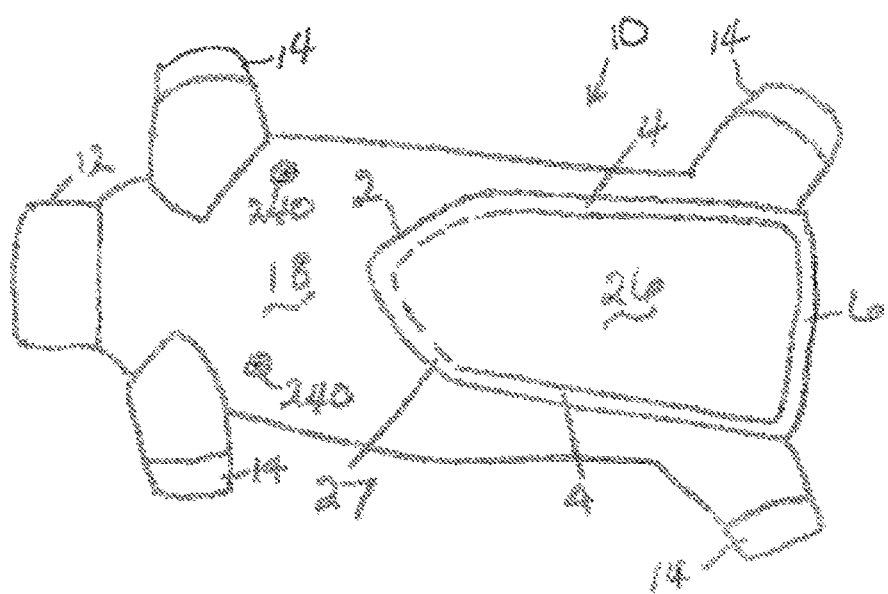
FIG. 2 is a plan view of the portion of the garment which fits over the underside, belly of the animal with the flap in its closed position.

Referring to FIG. 1, a single piece post-surgical garment for wearing by an animal, particularly a dog or a cat is indicated generally by 10. As shown in the drawings, garment 10 has a back portion and a belly portion, wherein the garment fits over the main body portion of the animal and has a collar 12 providing an opening for the neck of the animal, and cuffs 14 for leggings 25, providing openings for the leg portion of the garment. A tail opening 16 for the animal's tail is recreated by the back portion and the flap in the closed position. Referring to FIG. 2, the belly portion 18 of the garment fits over the belly of the animal and protects a wound or incision made when the animal is neutered or otherwise operated on. This can help prevent the animal form pawing, licking chewing or otherwise scratching at this area. This is important so that the animal does not pull apart the stitches or sutures used to close the incision. Damage to the incision could cause bleeding and increase the risk of infection.

Garment 10 is fitted over the animal successively by either pulling collar 12 over the head of the animal or closing the collar around the animal's neck. Each of the animal's legs is placed through a respective one of the cuffs 14. The garment has a lengthwise opening extending along the back portion 1 along the back of the animal that is closed, once the garment is fitted about the animal. As shown in FIG. 1, a placket 20 extends the length of along one side of the opening and a second placket 22 extends the length of the garment along the other side of the opening. Portions of fasteners 24, for example, snap fasteners, are spaced along the length of the plackets so that when the garment is in place closing the fasteners secures the garment over the animal's trunk with the animal's head, feet and tail protruding through the openings provided. Any suitable fastener can be used with this garment, including snaps, buttons, zippers or hook and loop-type fasteners.

Figure 9:
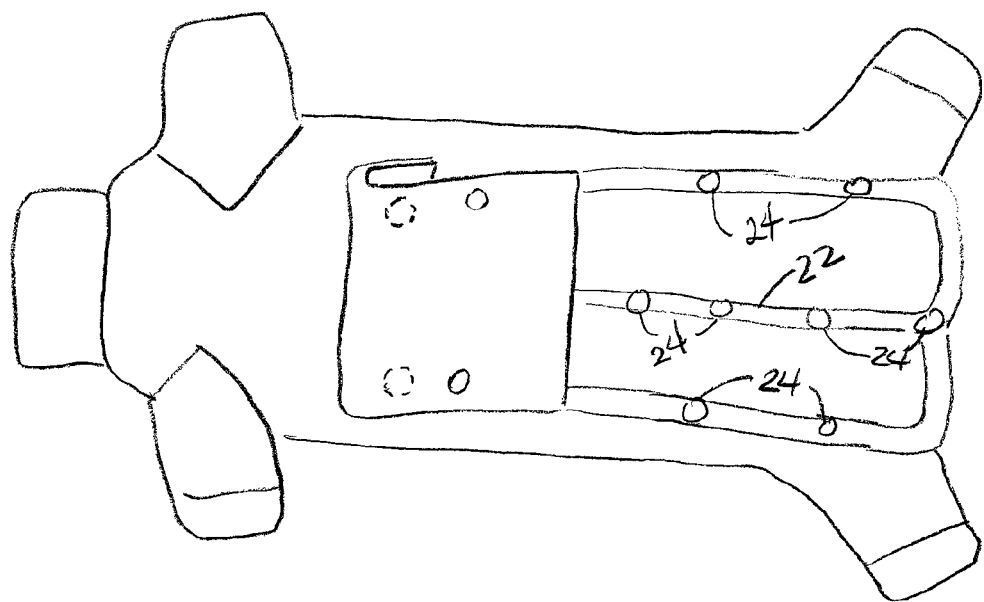
FIG. 9 is a plan view of the portion of the garment which fits over the underside, belly of the animal with the flap in its open and locked position.

As particularly shown in FIGS. 2 and 3, a flap 26 is formed on the belly portion 3 of garment 10 which, when in the closed position, covers the animal's penis or uterus and anus. As shown in FIG. 3, on the belly side of the garment is an opening 11 is defined by an opening front end 7, two opening sides 8, and an opening back end 9. The opening sides 8 have fasteners 24. The flap 26 has a flap front end 2, two flap sides 4 and a flap back end 6. The flap sides 4 have fasteners 24 which engage with the fasteners 24 on the opening sides 8 to close the flap. The front end 2 is either secured with stitches 27 or removeably fastened with fasteners. A tail opening 16 for the animal's tail is recreated by of the opening back end 9 of the back portion and the flap back end 6 of flap in the closed position. It is a particular feature of the invention that flap 26 is a forwardly folding flap that when unsnapped from its closed position shown in FIG. 2 is folded toward the head of the animal (i.e., forwardly) with fasteners 24 on the underside of the flap (see FIG. 3) can be engaged with fasteners 240 on the underside of the garment slightly behind the front legs of the animal (see FIG. 2). As shown in FIGS. 3 and 9, the flap 26 is folded forward, then folded again under at the folding line X-X so that the fastener 24 can engage with belly fasteners 240, securing the flap in the open locked position. The flap 26 is folded neatly and secured so as to not be soiled.

This feature allows the animal to discharge its boldily functions without soiling the garment and, at the same time, insuring that the incision(s) made in the animal remain at least partly covered while the animal is "doing its business". Once the animal has relieved itself the flap is readily returned to its unlocked closed position as shown in FIG. 2 with the surgical site fully covered.

Optionally, the flap 26 can be secured to the garment with stitching 27 as shown in FIG. 2. Further, optionally the flap 26 can be completely removable allowing one garment to have multiple removable flaps 26 that can be laundered as needed.

It will be understood by those skilled in the art that flap 26 may be filled with absorbent material to absorb blood or other discharge from the wound. Optionally, flap 26 has a pocket 29 that opens to allow a deposited absorbent pad to be inserted and replaced as needed. Further optionally, the flap 26 may have attached releasably a disposable absorbent pad that adheres to the flap next to the animal's belly and is replaced as needed. The absorbent material may also incorporate an odorant to cover any foul smells which may otherwise emanate from the discharge, urine, or fecal matter which is discharged into the flap.

It will be appreciated that garment 10 is not intended for long term wear by the animal, but rather is worn only for a short period after a surgery. Accordingly, the garment is designed to be easily put on and removed by a veterinary's assistant or the pet's owner. The material from which the garment is made is lightweight and washable. The garment material can be solid colored or patterned.

The garment can also be differently constructed from that shown in FIGS. 1-3. For examples, a garment 10A shown in FIG. 4 does not have a collar, but rather a band 10A which fits around the neck of the animal. The garment has fasteners 24A which are buttons which fit through button holes formed in the placket 20A. Other garment constructions are also possible without departing from the scope of the invention.

In FIG. 5, a garment 10B includes a flap 26B which folds over the back of the garment and is secured in place, again by fasteners 24.

In FIG. 6, a garment 10C which does not have leggings 25, but cuffs 14A to provide an opening for the leg portion.

In FIG. 7, a garment 10D has fasteners 24 down the back and a collar 12D. The garment does not have leg openings, but rather has leggings 27 and 28 foot coverings 28 at the end of the leggings, so that when the animal is wearing the garment 10D, its feet are entirely enclosed and covered. Optionally, the foot covering 28 can have skid resistant material applied to the terminus of the leg portion, such as rubber ribs, nubs or patches.

In FIG. 8, a garment 10E does not have any openings down the back, but rather is made of an elastic material that can be pulled-over the animal's head and body by opening the panel 26 and inserting the animal through there. The animal's feet are pulled through the leg portions, and the panel 26 fastened in the closed position creating the opening for the tail.

The embodiments were chosen and described to best explain the principles of the invention and its practical application to persons who are skilled in the art. As various modifications could be made to the exemplary embodiments, as described above with reference to the corresponding illustrations, without departing from the scope of the invention, it is intended that all matter contained in the foregoing description and shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

What is claimed is:

1. A post-surgical garment worn by an animal to protect a surgical site where the animal was operated upon so as to prevent the animal from pawing, licking, chewing, or otherwise scratching the surgical site so stitches or sutures used to close up an incision in the animal are not pulled apart which would increase the risk of infection, comprising:

a garment which fits over, above and about the animal's body, the garment having a neck opening and leg openings; wherein the garment has a forward end toward the neck opening and has a rearward end away from the neck opening;
wherein the garment has a back portion and a belly portion;
wherein the belly portion has an opening defined by an opening front end, two opening sides and an opening back end;
wherein along the two opening sides are fasteners;
wherein the garment has a flap extending over the belly portion of the garment;
wherein the flap has a flap front end, two flap sides and a flap back end; and
wherein the flap sides have fasteners on an underside of the flap;
wherein the flap has a closed position and an open position; wherein in the closed position, the flap protects the belly portion of the animal and the flap back end creates with the opening back end a tail opening, wherein in the open position, the flap is folded toward the forward end on the belly portion; wherein at least some of the fasteners on the underside of the flap are engaged with belly fasteners on the belly portion of the garment located between the opening front end and the neck opening to lock the flap in the open position.

2. The garment of claim 1, wherein the flap is fixably attached to the belly portion of the garment at the forward end.

3. The garment of claim 1, wherein the flap is entirely removeable and can be replaced as needed.

4. The garment of claim 1, wherein each of the leg openings terminates with a foot covering.

5. The garment of claim 1, wherein the back portion is releaseably opened and closed with fasteners.

6. The garment of claim 1, wherein the back portion does not have an opening.

7. The garment of claim 1, wherein the flap has a pocket into which absorbent material may be inserted and removed.

8. The garment of claim 1 wherein the fasteners are snaps.

9. A one piece post-surgical garment worn by an animal to protect a surgical site where the animal was operated upon so as to prevent the animal from pawing, licking, chewing, or otherwise scratching the surgical site so stitches or sutures used to close up an incision in the animal are not pulled apart which would increase the risk of infection, comprising:
a garment which fits over, above and about the animal's body, the garment having a neck opening and leg openings;
wherein the garment has a back portion and a belly portion;
wherein the belly portion has an opening defined by an opening front end, two opening sides and an opening back end;
wherein along the two opening sides are fasteners;
wherein the garment has a forward end toward the neck opening and has a rearward end away from the neck opening;
wherein the back portion is releaseably opened and closed with fasteners;
wherein the garment has a flap extending over the belly portion of the garment;
wherein the flap has a flap front end, two flap sides and a flap back end;
wherein the flap sides have fasteners on an underside of the flap;
wherein the flap is fixably attached to the belly portion of the garment at the forward end;
wherein the flap has a closed position and an open position;
wherein in the closed position, the flap protects the belly portion of the animal and the flap back end creates with the opening back end a tail opening,
wherein in the open position, the flap is folded forward at least twice on the belly portion; and
wherein at least some of the fasteners on the underside of the flap are engaged with belly fasteners on the belly portion of the garment located between the opening front end and the neck opening to lock the flap in the open position.

10. The garment of claim 9, wherein each of the leg openings terminates with a foot covering.

11. The garment of claim 9 wherein the flap has a pocket into which absorbent material may be inserted and removed.

12. The garment of claim 9 wherein the fasteners are snaps.

* * * * *